(12) United States Patent
Levine

(10) Patent No.: US 11,729,126 B2
(45) Date of Patent: *Aug. 15, 2023

(54) USER-CONTROLLED MESSAGE REMINDERS

(71) Applicant: Lazy Texts, LLC., Coral Springs, FL (US)

(72) Inventor: Charles Levine, Coral Springs, FL (US)

(73) Assignee: Lazy Texts, LLC, Coral Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,235

(22) Filed: Sep. 12, 2022

(65) Prior Publication Data

US 2023/0006957 A1    Jan. 5, 2023

Related U.S. Application Data

(63) Continuation of application No. 17/411,325, filed on Aug. 25, 2021, now Pat. No. 11,444,898, which is a
(Continued)

(51) Int. Cl.
*H04L 51/212* (2022.01)
*H04L 51/046* (2022.01)
*H04L 51/56* (2022.01)

(52) U.S. Cl.
CPC .......... *H04L 51/212* (2022.05); *H04L 51/046* (2013.01); *H04L 51/56* (2022.05)

(58) Field of Classification Search
CPC ..... H04L 51/212; H04L 51/046; H04L 51/56; H04L 51/36; H04L 51/214
See application file for complete search history.

(56) References Cited

U.S. PATENT DOCUMENTS 10,425,365 B2 *  9/2019  Lee ........................ H04L 51/066
11,327,777 B1 *  5/2022  Chawda ................ G06Q 50/20
(Continued)

*Primary Examiner* — Sargon N Nano
(74) *Attorney, Agent, or Firm* — Fleit Intellectual Property Law; Jon Gibbons; Paul D. Bianco

(57) ABSTRACT

A computing device and computer-implemented method to provide user-control short message service (SMS). The method begins with converting by a server, one or more user preferences into each third-party specific filter for one of a plurality of third-party servers. Next, a server, accesses data using at least one of API calls, web scraping, file transfer protocol (FTP), http methods, or a combination thereof, data using the third-party specific filter in a plurality of third-party formats from the plurality of third-party servers, wherein the data in the plurality of third-party formats from the plurality of third-party servers Next, the data in the third-party format is filtered, which has been accessed according to user preferences, the user preferences including a mobile device identifier. Next, the data in the third-party format is converted which as specified by the user preferences into a format compatible with the SMS protocol or an instant message for receipt by a messaging app. Finally, the data is sent in which has been converted into the SMS format or instant message to the mobile device as specified by the mobile device identifier.

20 Claims, 13 Drawing Sheets

Related U.S. Application Data continuation of application No. 17/228,442, filed on Apr. 12, 2021, now abandoned.

(60) Provisional application No. 63/008,802, filed on Apr. 12, 2020.

(56) References Cited

U.S. PATENT DOCUMENTS

| | | | |
|---|---|---|---|
| 2009/0271486 A1* | 10/2009 | Ligh | H04M 1/7243 345/173 |
| 2012/0329489 A1* | 12/2012 | McGary | H04M 15/8278 455/466 |
| 2014/0330860 A1* | 11/2014 | Yi | G10L 15/26 709/219 |
| 2015/0140961 A1* | 5/2015 | Midkiff | H04W 4/18 455/406 |
| 2016/0063878 A1* | 3/2016 | Subashchandrabose | G09B 5/12 434/322 |
| 2016/0164824 A1* | 6/2016 | Kalyanaraman | H04L 51/58 709/206 |
| 2018/0082602 A1* | 3/2018 | Schlender | G06F 16/435 |
| 2019/0206126 A1* | 7/2019 | Solomon | H04N 23/50 |
| 2019/0347947 A1* | 11/2019 | Schlender | G06F 16/435 |
| 2020/0251012 A1* | 8/2020 | Creamer | G09B 19/00 |
| 2022/0351633 A1* | 11/2022 | Carroll | G09B 7/02 |

\* cited by examiner

PLEASE FILL OUT YOUR INFORMATION DONE!

PREFERRED FIRST NAME (NICKNAME):
CHARLIE

SELECT CLASSES TO SKIP IF ANY:
CECS ADVISING, MATH SUCCESS, SARC

CLASS NAME TO CHANGE:
SELECT CLASS...

RECEIVED NEXT DAYS OF ASSIGNMENTS:
5

LAZY TEXTS PREVIEW

HEY CHARLIE, HERE ARE YOUR UPCOMING ASSIGNMENTS:

[TODAY] SUN, APR 05, 11:59 PM
PROG LANG'S ASSIGNMENT: C# - LINQ

[TODAY] SUN, APR 05, 11:59 PM
PROG LANG'S DISCUSSION TOPIC: C# - LINQ

[TOMORROW] MON APR 06, 11:59 PM
GAME AI ASSIGNMENT: PLAYTEST BUILD AND SURVEY

TUE, APR 07, 9:50 AM
DIFF EQ ASSIGNMENT: QUIZ (EXTRA

UPDATE    CLOSE

STUDENT PREFERENCES FILTERING

⌐702

| COURSES TO SHOW | COURSE-B | COURSE-K | • • • | COURSE-V |
|---|---|---|---|---|
| COURSES TO SKIP | COURSE-J | COURSE-M | • • • | COURSE-R |
| DAYS TO REMIND | 5 | | | |
| SKIP TO-DOS | YES | | | |
| TIME TO SEND | 7AM | | | |

STUDENT PREFERENCES FORMAT

⌐722

| COURSE NAMES | COURSE-B | COURSE-K | • • • | COURSE-V |
|---|---|---|---|---|
| LIMIT REMINDER AMOUNT | 160 CHARACTERS | | | |
| TIME ZONE | CENTRAL USA | | | |
| STUDENT NAME | JOE | | | |

*FIG. 7*

USER-CONTROLLED MESSAGE REMINDERS

CROSS-REFERENCE TO RELATED APPLICATIONS

This application claims priority from and is related to U.S. application Ser. No. 17/411,325, filed Aug. 25, 2021, which is claims priority to and is related to U.S. application Ser. No. 17/228,442, filed Apr. 12, 2021, which is claims priority to and is related to the U.S. Provisional Application No. 63/008,802, filed Apr. 12, 2020, each of these previously filed applications are hereby incorporated into the present application by reference in their entirety.

BACKGROUND

The disclosure relates to a system and method for user-controlled message reminders of with third-party systems and in particular for user-controlled message reminders of academic assignments with learning management systems and other data sources.

Learning management systems (LMS), such as, Canvas, Google Classroom, Blackboard, Schoology, Docebo, TalentLMS, Edmodo continue to grow in popularity. For example, Canvas, is a web-based LMS now used by more than 3,000 universities, school districts, and institutions around the world. LMS systems deliver and manage all types of content, including video, courses, and documents. In the education and higher education markets, an LMS will include a variety of functionality that is similar to corporate but will have features such as rubrics, teacher and instructor-facilitated learning, a discussion board, and often the use of a syllabus.

Canvas is a powerful and flexible platform that includes many features and allows third-party developers to offer additional features. For example, Canvas offers SMS notifications, including course content. This is how Canvas notifies users about their upcoming planner items. One limitation with Canvas's system is that students are only notified when a planner item is posted or changed. As a result, students can miss assignments.

SUMMARY

In one example disclosed is a method for providing a user-control message service. The message service can be one of a short message service (SMS), multimedia messaging service (MMS), GroupMe, FB Messenger, and a voice call. The method begins with accessing, by a server, data in a third-party format from a third-party server, where the server and the third-party server are controlled by different business entities. The third-party server can be running one of any one or more of a learning management system, email system, and other data sources. As an example, the accessing is performed using one or more of API calls, web scraping, file transfer protocol (FTP), and http methods. In another example the accessing includes accessing reminders from a syllabus using an API or optical character recognition.

Next, the data in the third-party format is filtered, which has been accessed according to user preferences, the user preferences including a mobile device identifier. The filtering includes one or more of show courses, skip courses, set days, and skip completed to-dos. The filtering may also include one or more of planner is empty, time and time-zone, active status, texts paused, and skipped days of week.

Next, the data in the third-party format is converted as specified by the user preferences into a format compatible with the message service. In one example, converting the data in the third-party format into a format compatible with the message service is one of a SMS protocol or an instant message for receipt by a messaging app. The user preferences for formatting may include one or more of classes, customized course names, birthday, time format, time-zone, name, and limited reminder amount.

The user preferences for formatting include one or more of customized course names, time format, time-zone, name, and limited reminder amount. Finally, the data is sent in which has been converted into the message service to the mobile device as specified by the mobile device identifier. In one example, the data is sent, which has been converted into the SMS format to an SMS gateway to send to the mobile device as specified by the mobile device identifier. For example, the data is sent, which has been converted into the SMS format or instant message to the mobile device as specified by the mobile device identifier. As another example, the data is sent which has been converted into the SMS format to an SMS gateway or through the use of a CPaaS API to send to the mobile device as specified by the mobile device identifier.

In another example the process continues by accessing, by the server, data in an additional third-party format from an additional third-party server, wherein the server and the additional third-party server are controlled by different business entities. Next, the data is filtered in the additional third-party format which has been accessed according to user preferences, the user preferences including a mobile device identifier. Next, the data is converted in the additional third-party format which, as specified by the user preferences, into a format compatible with the message service. Finally, the data is sent, which has been converted into the message service to the mobile device as specified by the mobile device identifier.

In yet another example, the process above includes receiving a request from a plurality of users to join a collaborative group. In this example, the filtering the data in the third-party format which has been accessed according to user preferences, the user preferences including a mobile device identifier for each of the plurality of users. And further, in this example, the sending the data which has been converted into the message service includes sending to the mobile devices as specified by the mobile device identifier for each of the plurality of users.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 4 are a screenshot of an example webpage that a user can preview the text message that would be received based on the settings, according to the present invention;

FIG. 7 is a table of user filter and formatting preferences, according to the present invention.

DETAILED DESCRIPTION

Figure 1:
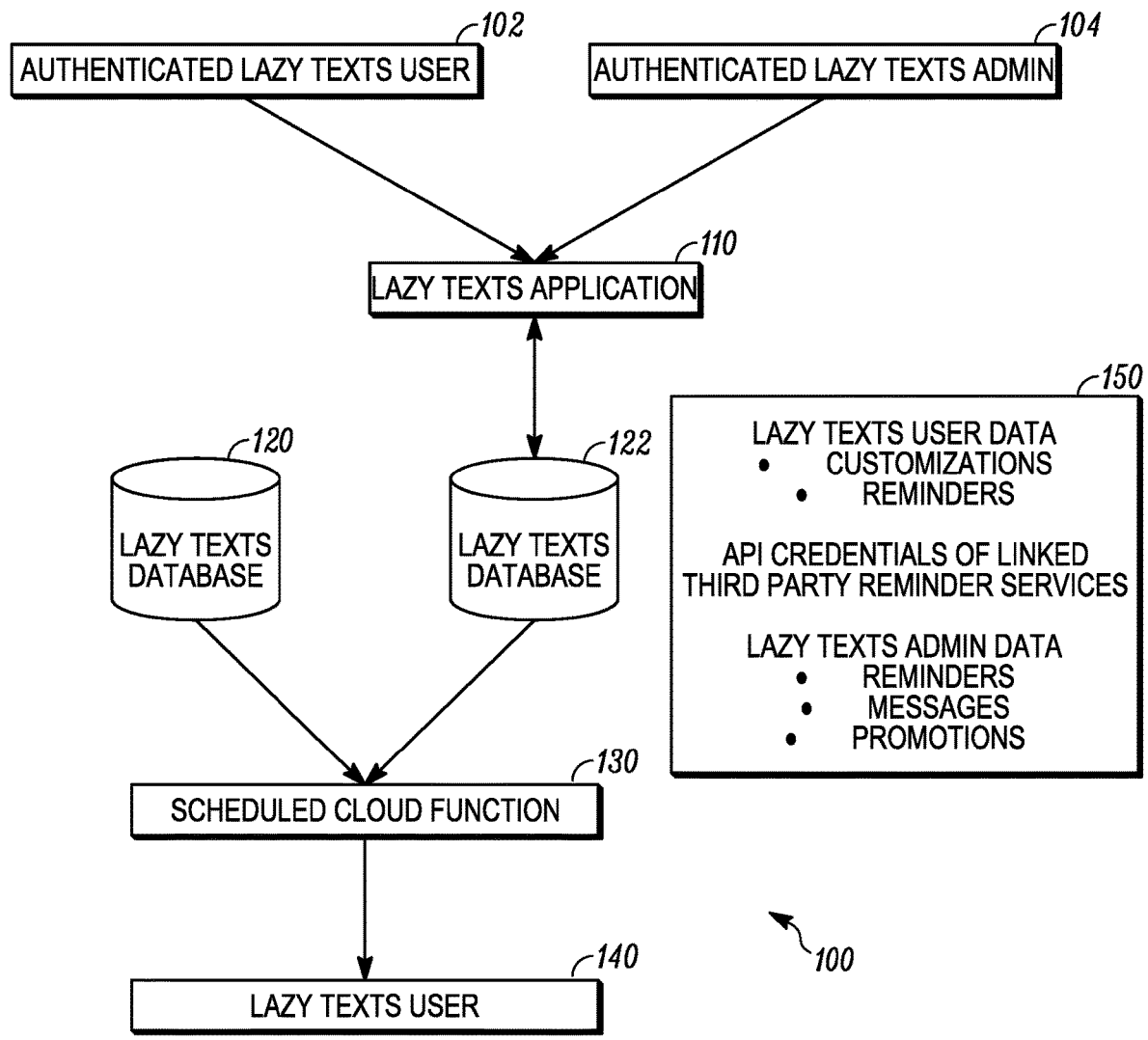
FIG. 1 is an example flowchart of the system and method, according to the present invention.

As required, embodiments are disclosed herein; however, it is to be understood that the disclosed embodiments are merely examples and that the methods described below can be embodied in various forms. Therefore, specific structural and functional details disclosed herein are not to be interpreted as limiting but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention is directed to a successfully commercialized version of the software under the brand name Lazy Texts™ App. In one example, the present invention to text users a list of the upcoming items on their learning management systems, such as, but not limited to the Canvas planner. The types of planner items that can be found on a planner are assignments, quizzes, discussion topics, announcements, and calendar events. The Lazy Texts App fetches the items from the user's Canvas planner that are due within the number of days the user specifies. It then filters the list based on the user's several customizations and compiles one or more text messages to send.

Although the description here is directed to text messages, it is important to note that other messaging types can be used, as further described in the section entitled "Non-Limiting Definitions." A message is any communication from one electronic device to another electronic device, typically from a server to a client, such as a push notification, a web browser notification, email, short message service, or instant message using a messaging app. The message may include the information embedded in it or a link, such as a URL (uniform resource locator), to a website or other address for additional information. In one example, the user can specify that in addition to sending reminders as texts (SMS, WhatsApp, etc.) the user can also receive a message that is an image or voice recording for ADA compliance.

Currently, up to three text messages are part of the Lazy Texts App, but the disclosure contemplates additional text messages. The first text includes a user's assignments, quizzes, and discussion posts; the second text includes a user's announcements; and the third text includes a user's calendar events. All users receive at least the first text, with the last two texts being optional. Text messages display each planner item by showing its due date, course, type (assignment, quiz, etc.), and name. Users may also opt to receive more than one text per day and select the times at which the texts will be sent. Available customizations options can depend on the subscription package that the user selects.

The user personalizes their text message with customization options on the Lazy Texts website, LazyTexts.com, where the user creates an account with their phone number. Their customizations are saved on their account and can be changed at any time to be applied to the next text they receive. The next text they receive can be previewed on the website, and the preview is updated whenever the user saves their changes.

The first customization option is their preferred first name (nickname) that they will be called in the opening sentence of the text. The user then selects if they want the course associated with each planner item to be included in their text. The user can also choose to omit certain courses from a list of courses they are enrolled in. Users also have the option to change the name of each course from that used in Canvas, where they are encouraged to shorten the name of their courses, to keep the texts more concise and, therefore, more readable for the user. The course name change can also be reflected in their Canvas. Finally, users can set a limit to the planner items they receive by both specifying the maximum number of days out for each planner item to be, and the maximum number of planner items to fully display in the text; the remainder of planner items are displayed as a number at the end of the text.

The user's customization options are stored in a database. They are set to default values when the user signs up on the website. The main program that sends the texts runs independently of the website and is pulling the user's customization options at runtime. The website is intended first for the user to sign up to receive their texts and then as a means for the user to log in easily to modify their customization options.

As previously noted, Canvas does offer SMS notifications, including course content. One problem with Canvas's system is that users are only notified when a planner item is posted or changed. Furthermore, the notifications that Canvas offers for course content are not customizable. One aspect that sets the Lazy Texts App apart is that it is more user-friendly and gives the user a vast array of customization options, as detailed above, to allow them to receive no more and no less than what they need to see to keep them organized.

Non-Limiting Definitions

The terminology used herein is for the purpose of describing particular embodiments only and is not intended to be limiting of the invention. As used herein, the singular forms "a", "an", and "the" are intended to include the plural forms as well, unless the context clearly indicates otherwise.

The term "access" refers to gathering information from a third-party application, such as a learning management system or calendaring application. Access is accomplished through API calls, web scraping, file transfer protocol (FTP), and http methods.

The term "application programming interface" or API is an interface that defines interactions between multiple software applications. It defines the kinds of calls or requests that can be made, how to make them, the data formats that should be used, the conventions to follow, etc. APIs for email systems such as GMAIL and Microsoft Outlook, learning management systems, and other data sources are published by the software provider.

To clarify the use of and to hereby provide notice to the public, the phrases "at least one of <A>, <B>, . . . and <N>" or "at least one of <A>, <B>, . . . <N>, or combinations thereof"" or """<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The term "client device" is any device, such as a computer, laptop, smartphone, tablet, television, or other information processing device in which web-browsers and apps can be processed.

The terms "comprises" and/or "comprising," specify the presence of stated features, steps, operations, elements, and/or components, but do not preclude the presence or addition of one or more other features, integers, steps, operations, elements, components, and/or groups thereof.

The term "homogenous format" means a uniform, single structure or format.

The term "message" is any communication from one electronic device to another electronic device, typically from a server to a client, such as a push notification, a web browser notification, email, short message service or instant message using a messaging app such a Discord, Facebook Messenger, iMessage, Signal, Slack, Telegram, WhatsApp, WeChat and QQ Messenger, Viber, Line, and Snapchat and other apps that enable instant messaging. The messaging may include the information embedded in it or a link, such as a URL (uniform resource locator) to a website or other address for additional information. Further, the message may contain text, video, audio, or other multimedia content.

The term "message service" is an originating source for a message. It may be a learning management system (LMS), a messaging app, a calendar app, or an instant messaging app.

The term "message service format" is an originating source format for a message. It may differ depending on the source. For example, a calendar app may use a first format, whereas a messaging app may use a different format.

The term "SMS Gateway" facilitates SMS traffic between businesses and mobile subscribers, including SMS for enterprises, content delivery, and entertainment services involving SMS, e.g., TV voting. Considering SMS messaging performance and cost, as well as the level of messaging services, SMS gateway providers can be classified as aggregators or SS7 providers.

The term "SMS message" or short message service message is a text messaging service component of most telephone, Internet, and mobile device systems. It uses standardized communication protocols that let mobile devices exchange short text messages. The service allows users to send and receive messages of up to 160 characters (when entirely alpha-numeric) to and from GSM mobiles. Although most SMS messages are sent from one mobile phone to another, support for the service has expanded to include other mobile technologies, such as ANSI CDMA networks and Digital AMPS.

The term "user preferences" or "user customizations" means a customizable configuration value used to select, filter, format, and time or time schedule when SMS messages are sent based on data from a third-party platform. User preferences include customized course names, time (e.g., a message is sent at 5 AM), time-zone, name (e.g., Hey JOHN DOE, here are your upcoming reminders:), show courses (e.g., Biology Assignment: XYZ versus Assignment: XYZ), customize course name (e.g., change BSC1101 to Bio), skip courses (e.g., ALL reminders from BSC1000 will be excluded.), set days (e.g., choose to only see reminders that are 5 days out), limit reminder amount (e.g., choose to only see next 5 reminders), and skip completed to-dos (e.g., if reminder marked complete on the third-party reminder service it will be excluded from text).

The term "third-party platform" means a party that is a separate business entity from the party using user preferences to access data. Third-party systems include email systems such as Gmail and Microsoft Outlook, learning management systems, and other data sources.

The phrase "web scraping" means a process of using bots to extract content and data from a website. Typically web scraping extracts underlying HTML code and, with it, data stored in a database.

Over All System Flow

Turning now to FIG. 1, shown is an example flowchart 100 of the system and method, according to the present invention. Two types of authenticated access to the Lazy Texts system 110 are provided. The first type of authenticating access is authenticated users 102, which can only access data associated with the individual users. In another example, the authenticated users 102 can be part of a group of two or more authenticated users who can access the entire "group's data. The second type of authenticated access is authenticated administrators 104, which can access data belonging to all users.

Lazy Texts system 110 is able to access information from its own database 122 and access information from a third-party database 120, e.g., Gmail and Microsoft Outlook, learning management systems, and other data sources.

Next, a scheduled cloud function 130 pulls user data from database 122 and third-party information from third-party database 120. The schedule cloud function 130, then shares the data with the user 140. The Lazy Texts system can pull information from third-party database 120 by API calls, web scraping, file transfer protocol (FTP), and http methods. The scheduled cloud function algorithmically converts and formats data into a standardized format to send a message. The data is converted based on the user preferences and rules defined for each user. In one example, the message is a text message. In another example, the message is Discord, Facebook Messenger, iMessage, Signal, Slack, Telegram, WhatsApp, WeChat and QQ Messenger, Viber, Line, and Snapchat, and other apps that enable instant messaging. Examples of Lazy Texts user data include customizations, reminders, API credentials of linked third part reminder services. The Lazy Texts Admin Data includes reminders, messages, and promotions 150.

Figure 2:
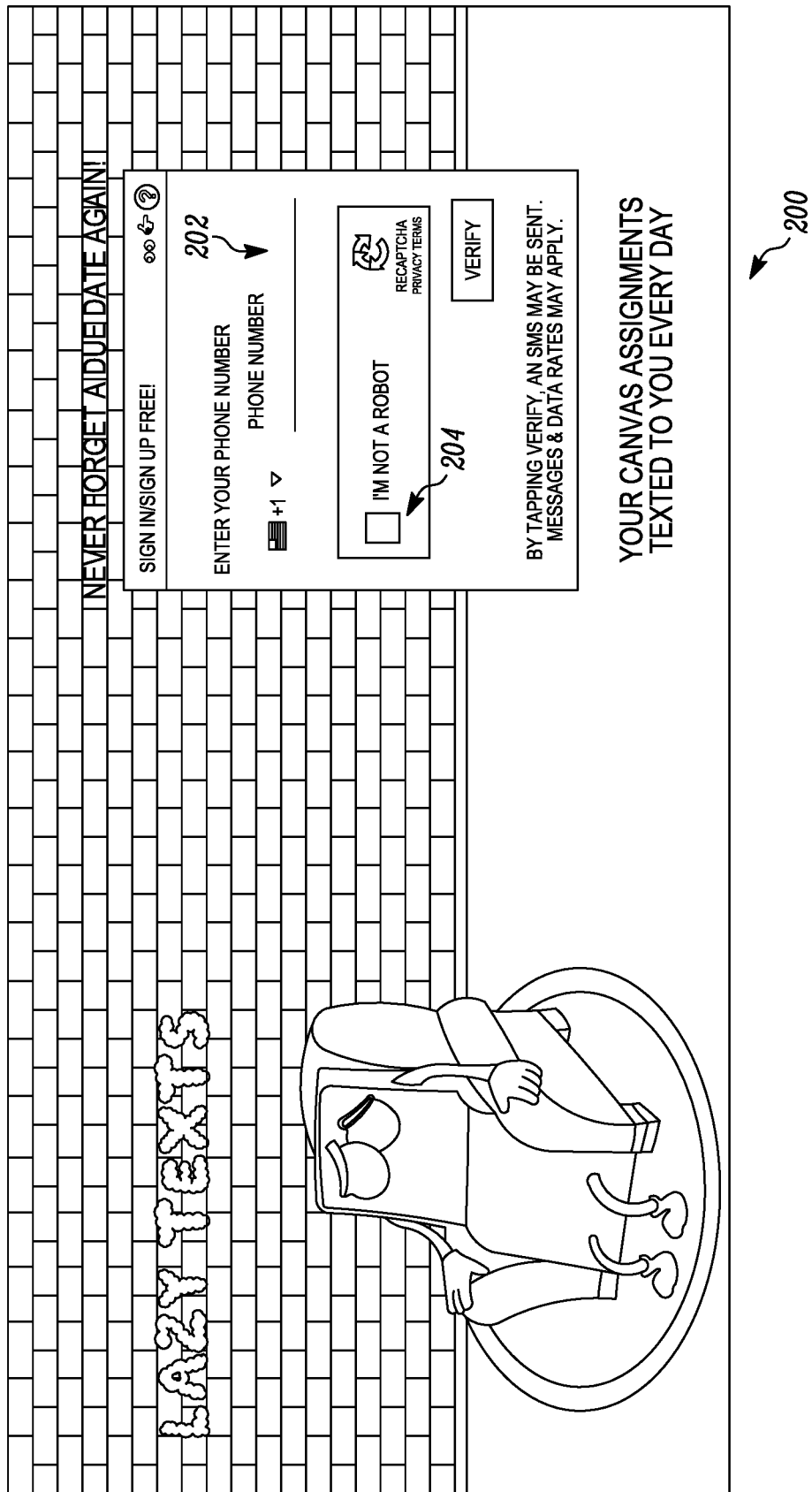
FIG. 2 is an example screenshot of a webpage where a first-time user can sign up for the service or a returning user can sign-in to their account, according to the present invention.

FIG. 2 is an example screenshot 200 of a webpage where a first-time user can sign up for the service or a returning user can sign in to their account, according to the present invention. Shown is a mobile number field 202 and captcha 204.

Figure 3:
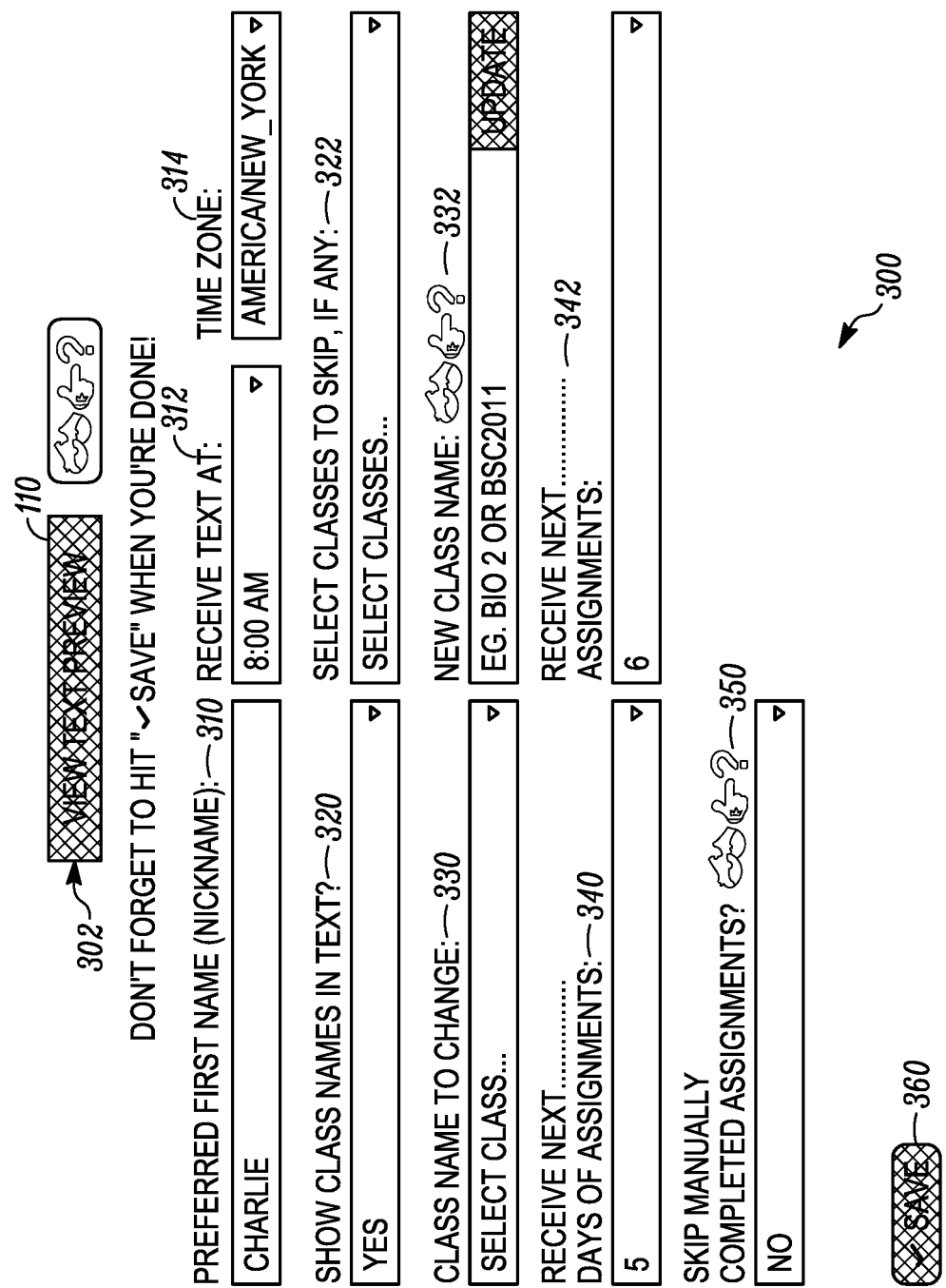
FIG. 3 is a screenshot of example webpages where a user can add and/or edit their settings, according to the present invention.

FIG. 3 is a screenshot 300 of example webpages where a user can add and/or edit their settings, according to the present invention. Fields shown include nickname 310, received text at 312, time zone 314, show class names in text 320, select classes to skip, if any, 322, class name to change 330, new claim names 332 based on 330, receive the next number of days or assignments 340, receive the next number of days or assignments 342, skip manually completed assignments 350, and save button 360.

After filling out these fields in FIG. 3, the user can select the preview button 302 to show how the text is converting the data into an SMS message.

Figure 5:
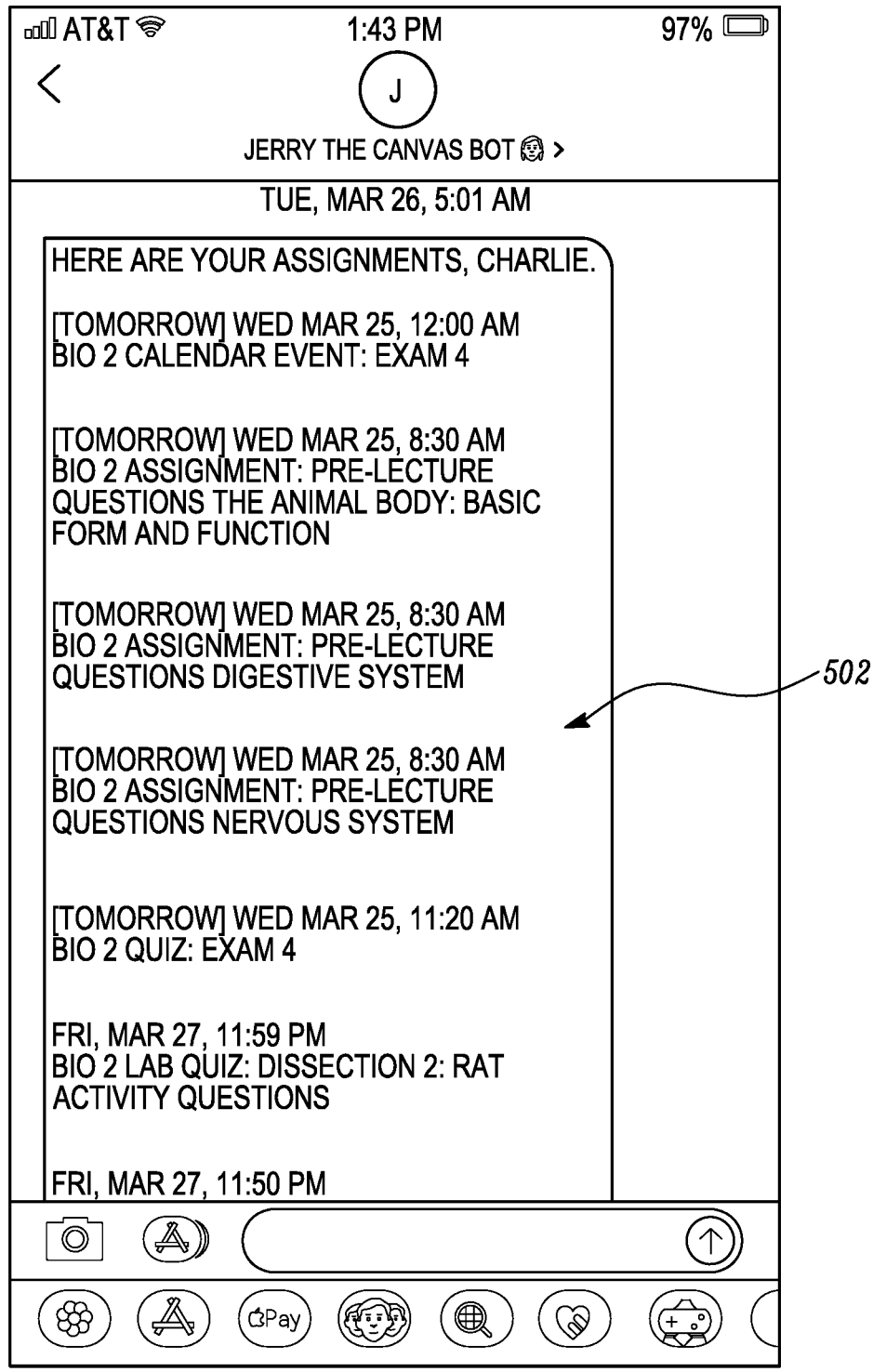
FIG. 5 is a sample text message a user would receive with upcoming assignments, according to the present invention.

Turning to FIG. 4 are a screenshot of an example webpage 400 that a user can preview the text message 402 that would be received based on the settings, according to the present invention. Continuing further, FIG. 5 is a sample text message 502 a user would receive with upcoming assignments, according to the present invention.

Data Handling

Figure 6:
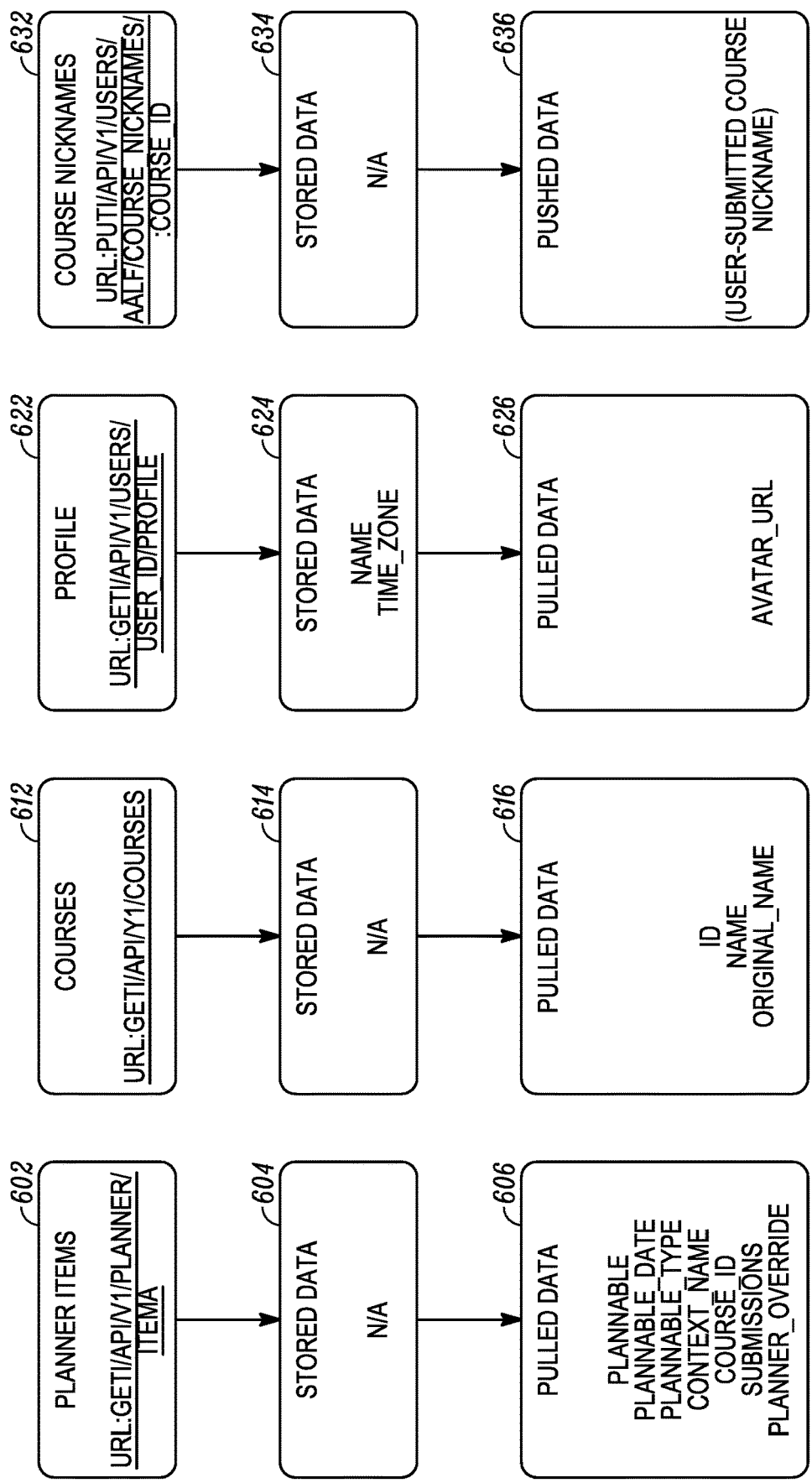
FIG. 6 is a diagram of the data handling process, according to the present invention.

FIG. 6 is a diagram of the data handling process 600, according to the present invention. Shown are three types of data. The first type of data is "stored data", which is data that the examples of that the Lazy Texts system pulls from the Canvas learning management system and stores in the system's own database. The second type of data is "pulled data" that data pulls from the Canvas learning management system to the Lazy Texts system but typically does not store. This is typically the data that the Lazy Texts system uses. The third type of data is "pushed data" which is data that examples of the Lazy Texts system pushes to the Canvas learning management system and typically does not store.

Continuing further, shown are four sources of data with the Canvas learning management system. The four sources of data are planner items 602, 604, and 606, course 612, 614, and 616, profile 622, 624, and 626, and course nickname 632, 634, and 636. The planner items include pulled data plannable, plannable data, plannable type, content name, course id, submissions, and planner outside.

FIG. 7 is an example table 702 of user preference filtering and an example table 722 of user preference formatting, according to the present invention. For table 702, example preferences as set by the user in FIG. 3 are shown. Preferences shown include "courses to show", "courses to skip", "days to remind", "skip to-dos", and "time to send." Likewise, for table 722. example preferences as set by the user in FIG. 3 are shown. Preferences shown include "course names", "limit reminder amount", "time zone", and "student name". Other preferences and table formats may be used in another example.

Flow Chart

Figure 8:
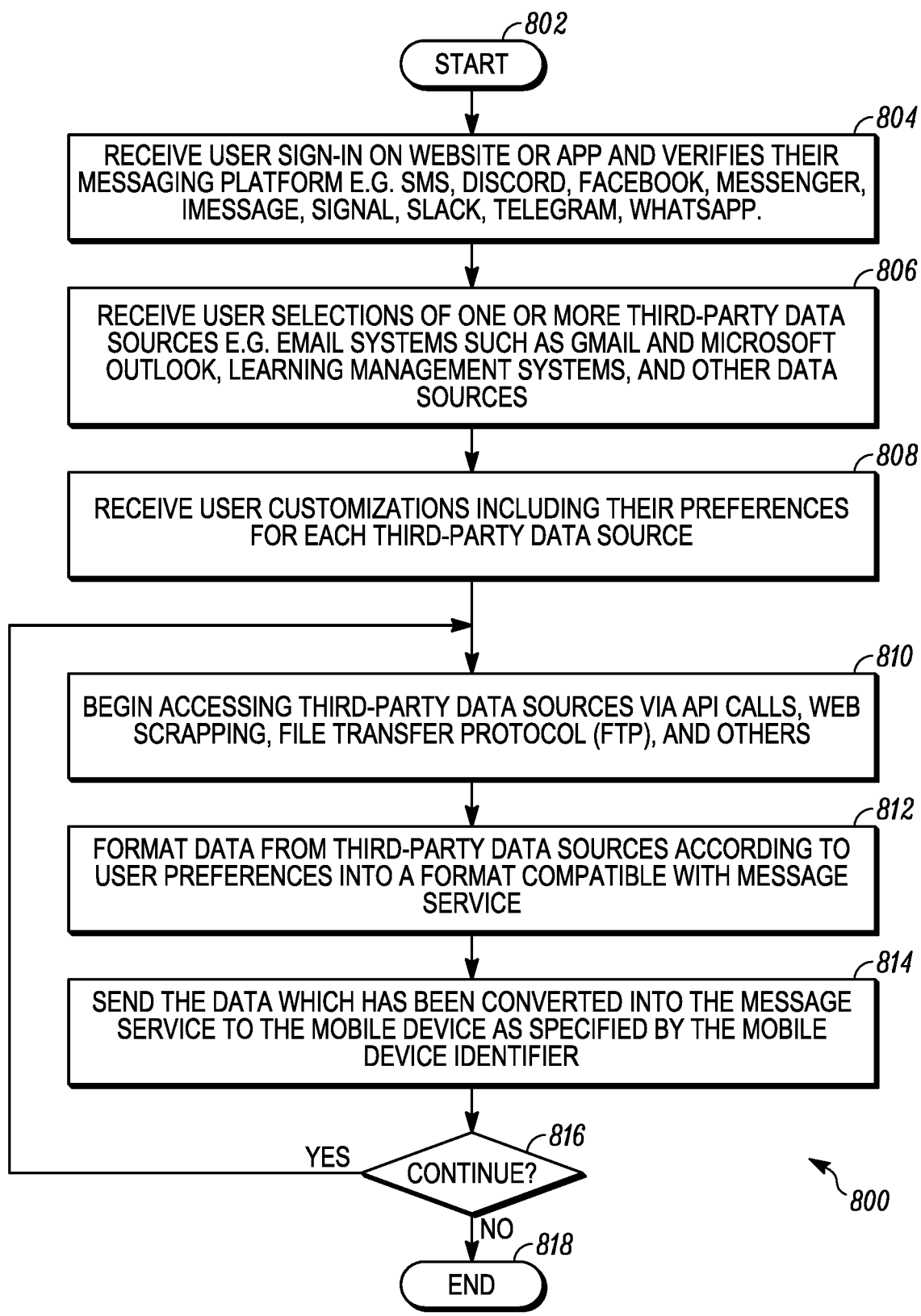
FIG. 8 is a flow chart of the overall process, according to the present invention.

FIG. 8 is a flow chart 800 of the overall process, according to the present invention. The process begins in step 802 and immediately proceeds to step 804. In step 804, the process receives a user sign-in on web site or app. The process continues to step 806.

In step 806, the user verifies their messaging platform e.g., SMS, discord, Facebook messenger, iMessage, Signal, Slack, Telegram, and Whatsapp. For example, the user may sign up with their phone number on the Lazy Texts app or Lazy Texts website. The user verifies their phone number with a 6 digit one-time password texted to their phone. Once verified, the user links Canvas by selecting their school and all of their third-party reminder services. To verify and link the user's account, such as Canvas learning management system, they are taken to the Canvas website to log in and then automatically signed up and taken back to the Lazy Texts app or website. The process continues to step 808.

In step 808, the Lazy Texts system receives user customizations, including their preferences for each third-party data source. FIG. 3 shows an example user interface. The users can change a course name. For example, users can customize course names, changes will be reflected in Canvas through Canvas API. Other customizations include time (e.g., text sent at 5 AM). The Lazy Texts system converts the user's set time to EST time based on the time and time zone they set, and stores that EST time in the database. Name (e.g., Hey JOHN DOE, here are your upcoming Lazy Texts reminders:). Other customizations include:
  Show Courses (e.g., Biology Assignment: XYZ vs. Assignment: XYZ).
  Customize course name (e.g., Change BSC1101 to Bio).
  Users can skip Courses (e.g., ALL reminders from BSC1000 will be excluded).
  Set Days (e.g., Choose to only see reminders that are 5 days out).
  Limit Reminder amount (e.g., Choose to only see next 5 reminders).
  Skip completed to-dos (IF reminder marked complete on the third-party reminder service, it will be excluded from text).
  Birthday (e.g., Happy birthday John Doe!) if the birthday is the same day as the text sent).

Further, the user can set extra reminders, including:
  Users can add their own reminders (Name, type, course, date).
  They can link a reminder to a course they are enrolled in.
  Users can add reminders that aren't for a specific class (Academic advisor appointments, registration dates, etc.).
  Users can share extra reminders with friends.
  Users can choose to be a part of an extra reminders group for a certain class to receive extra reminders other classmates have added.
  Users can duplicate reminders with customized dates.

Further, the user can update their profile:
  Users can manage their linked school/other third-party reminder services
  Users can pause their text messages (Also done by texting STOP to the Lazy Texts phone number)

The users can then either choose to set customizations and extra reminders or not do anything and accept Lazy Texts default settings. Further, the users can see a text preview that shows what their personalized text would look like. The process continues to step 810.

In step 810, the process enters a loop. The Lazy Texts system begins accessing third-party data sources via API (application programming interface) calls, web scraping, file transfer protocol (ftp), and others. The process continues to step 812.

In step 812, the reminders are organized by due date/time. The reminders can be from learning management systems such as Canvas, extra reminders, school messages, Lazy Texts messages, email systems (scrape for reminders), calendars (Outlook, Google), doctor's appointments, etc. The reminders are formatted data from third-party data sources according to user preferences into a format compatible with message service. These filters may include
  Skip planner items that are marked as submitted or graded in Canvas.

Skip planner items marked as "marked complete" if the user chose to skip completed to-dos Skip planner items marked with plannable_type of 'wiki_page' and 'calendar_event'

Skip planner items marked with course_id matching to any course skipped by the user The text message format may include in any text:

Advertisements via text message

Messages from Lazy Texts

Messages from the user's school

Happy Birthday! (if applicable)

Good luck with your exam today! (if applicable) Normal text

Hey (NAME), here are your upcoming Lazy Texts reminders:

[Today/Tomorrow (if applicable)] Sat, April 10, 11:59 PM (ddd, MMM DD, h:mm A) LZY1000(COURSE ID) Assignment (Reminder type): Do the thing! (Reminder name)

If no reminders within the next 5 (based on the user's limit reminders customization) text says:

Hey NAME, you have nothing in the next x days,

If you want to get ahead, here is your next Lazy Texts reminder:

[Today/Tomorrow (if applicable)] Sat, April 10, 11:59 PM (ddd, MMM DD, h:mm A) LZY1000(COURSE ID) Assignment (Reminder type): Do the thing! (Reminder name)

No reminders in a month

Hey JOHN DOE, it looks like you have nothing coming up for the next 28 days. "I'll let you know when something new is assigned!

Flow

The program is run every hour in EST (America/New York TZ)

Queries the list of ACTIVE Lazy Texts users from the database whose selected time translated to EST is the same as when the program is run.

includes user's customizations and information

For Each User

Refreshes user's access tokens to Canvas/other services.

Validates user's data to ensure they are within defined constraints (e.g., no more than 8 reminders in the text at a time).

Fetch user's reminder data from all sources.

Merge reminders from all sources into one list.

Sort the list by date in ascending order.

Cut list off based on limit days and limit reminders.

Format list of reminders into a text message.

Send a text message to the user.

Tracks text segments sent to each user by counting characters in the text message.

The data which has been converted into the message service to the mobile device as specified by the mobile device number 814. The process loop checks in step 816, if it should continue running based on user preferences. In the case it will continue to run, the process loops back to step 810. Otherwise, the process ends in step 818.

Operating Environment

Figure 9:
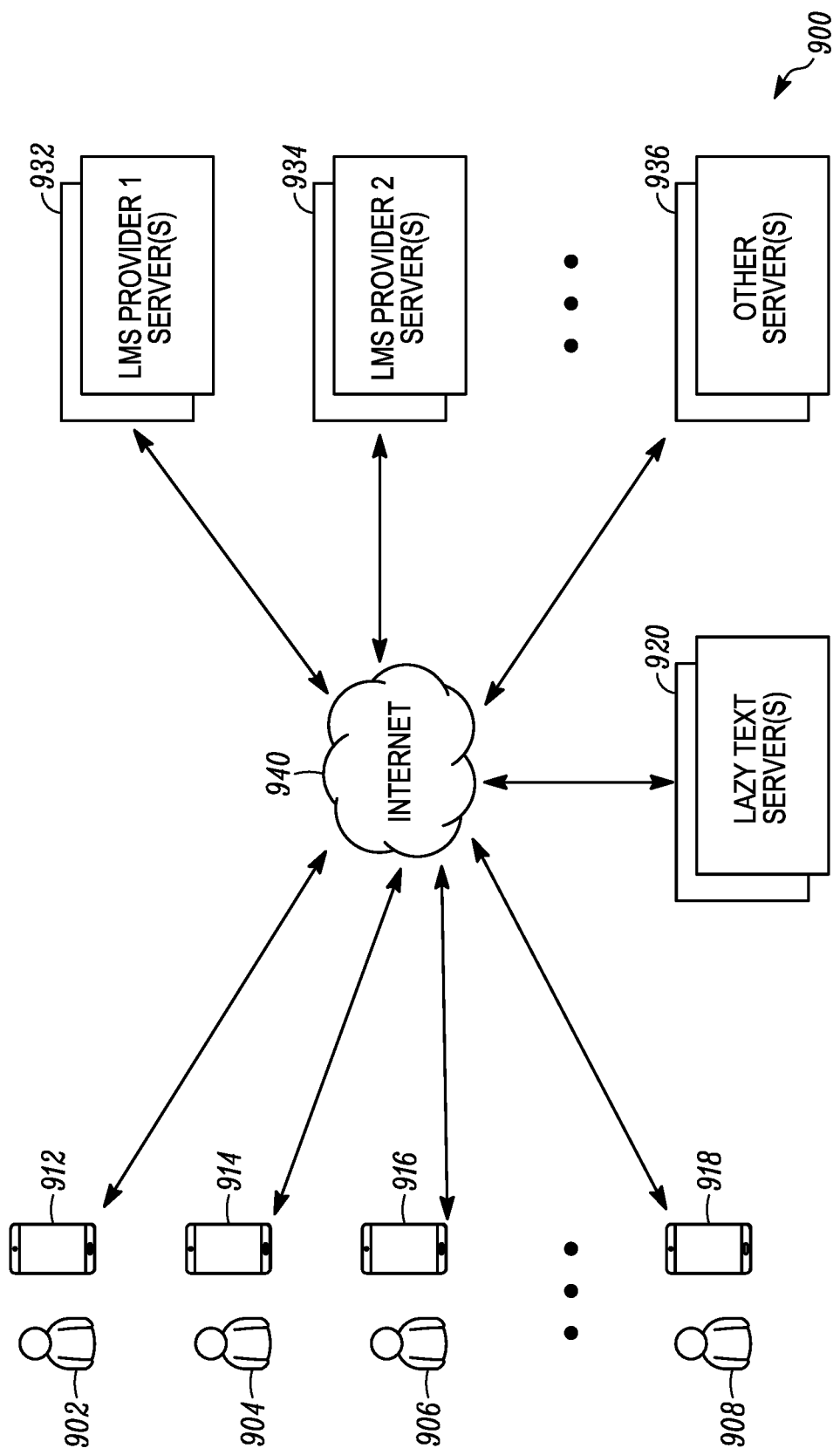
FIG. 9 is a diagram depicting the operating environment, according to the present invention.

Referring to FIG. 9, is a diagram depicting the operating environment 900, according to the present invention. Are third-party server computers 932, 934, 936 connected to a network, e.g., the Internet 940 or a global communication network. Also shown is a Lazy Texts Server 920, which is independent and managed by a separate business entity of server computers 932, 934, 936. The Lazy Texts Server 920. The instruction sets and subroutines, and process flows described above to manage messages between client devices 912, 914, 916, and 918 may come through the Lazy Texts Server 920 or via a separate network. In another example, the server computers 932, 934, 936, such as a language management system (LMS) can be owned the same business entity. Stated differently, in this example Lazy Texts, LLC owns a learning management system, i.e., an in-house learning management system. For this example, call the in-house learning management system MyTextMate LMS. Then, Lazy Texts LLC's student reminder service can connect their MyTextMate LMS account to be included with their other third-party LMS planner items and extra reminders. In yet another example, the system may include both an in-house learning management system and a third-party learning management system. The third-party is a separate business entity. Whether the LMS is in-house or a third-party, typically, the format of the message must be changed from what is stored in the LMS and what is sent to the user, in addition to the user's customizations.

Examples of server computers 920, 932, 934, 936 may include but are not limited to: a personal computer, a server computer, a series of server computers, a mini-computer, and a mainframe computer.

The messages received at client devices 912, 914, 916, and 918 as a client-side application may, e.g., be a stand-alone application, interface with an email client application or may be an applet/application that is executed within email client application or messaging application. Accordingly, the message propagation process may be a server-based process, a client-side process and/or maybe a hybrid client-side/server-based process, which may be executed, in whole or in part, by a client application and by the email server application. Examples of client devices 912, 914, 916, and 918 may include but are not limited to, personal computer, laptop computer, cellular telephone, smartphone, notebook or tablet computer, and a dedicated network device.

Users 902, 904, 906, and 908 interact through physical keys and keyboard, virtual keys and keyboards, and other graphical user interface components such as displays, microphones, and speakers to interact with client devices 912, 914, 916, and 918.

The various client devices may be directly or indirectly coupled to network 940. For example, a client device may be directly coupled to network 940 via a hardwired network connection. Further, another client device may be wirelessly coupled to network 940 via wireless communication channel established between the client device and wireless access point (i.e., WAP IEEE 802.11a, 802.11b, 802.11g, Wi-Fi, and/or Bluetooth device), which may be directly coupled to network 940.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows, e.g., mobile phones, computers, and personal digital assistants to be interconnected using a short-range wireless connection.

Client devices 912, 914, 916, and 918 may each execute an operating system, examples of which may include but are not limited to Microsoft Windows, Apple iOS, Google Android, Linux, BlackBerry OS, or a custom operating system.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code embodied thereon.

Connected Accounts or Parental Notification

Figure 10:
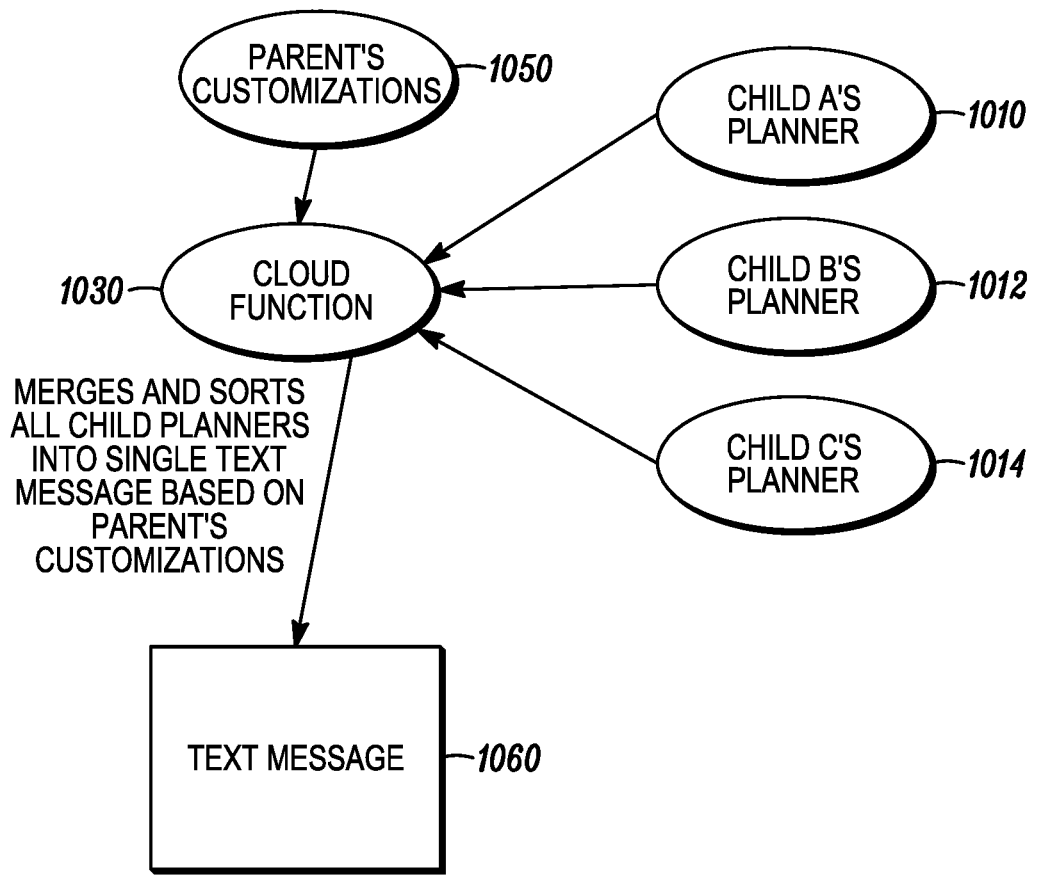
FIG. 10 is a diagram depicting connected accounts or parental notifications, according to the present invention.

Turning to FIG. 10, illustrated is an example of connected accounts or also known as parental notifications. Shown in this example is a group of different sources of calendars that are all linked to one or more user accounts. More specifically, the different sources of calendars shown in this example are Child A's Planner 1010, Child B's Planner 1012, Child C's Planner 1014, all linked to a parent or guardian's user account as part of the scheduled cloud function 1030. If two parents our guardian's desire to be grouped, this is possible as well. Also shown are parent's customizations 1050, which feed into the scheduled cloud function 1030. In this example, all the sources of the child planners 1010, 1012, 1014 are merged into one or more messages 1060 based on the parent's customizations 1050. Many language management systems have included in their API, whether an account is related to another account, such as whether it is a parent or child account. The accounts can be grouped based on this relationship.

Urgent Notifications

In one example, the messaging system of FIG. 1 provides an option to send urgent notifications. Here is the scenario, the user receives a message at 8 AM of an "Assignment Y" posted by a teacher is due in three days. That same day, at 9 AM, the same teacher posts an urgent assignment— "Assignment X" due by the end of today, i.e., the same day the teacher posts Assignment X. According to the user's preferences, such as those shown in FIG. 7, including when to send messages, the schedule cloud function 130 would typically send a message the Assignment X at a date/time, e.g., the next morning. In this example, the system compares the due date of any newly posted assignment from any source. If the due date of the new assignments is prior to the schedule date/time of the next message to be sent as specified in the user's preferences, the system automatically sends the message containing the urgent assignment. The user's customization may also set other thresholds. For example, if the due date of a new assignment is before a given number of days, for example, 2 days, then the system will send a message containing the assignment out immediately.

Message Preview

Figure 11:
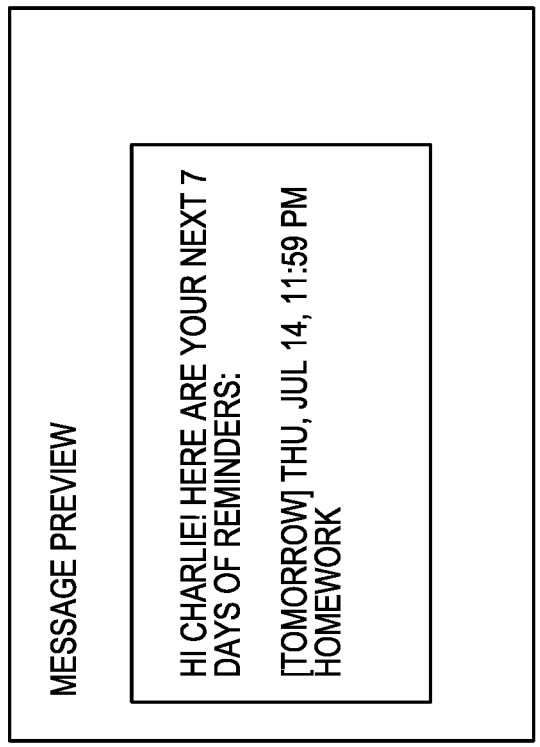
FIG. 11 is an example of a preview message, according to the present invention.

Turning to FIG. 11, shown is an example preview message according to the user's customization in FIG. 7. This feature is useful to allow a user to view or preview the next message they will receive, based on the current snapshots of their planners, which could change before they receive their next reminder. The user can adjust their own customizations using the preview before the next message is received. This preview may be via a website, a mobile app or widget, a message or anywhere digital medium can be viewed.

Extra Reminder

Figure 12:
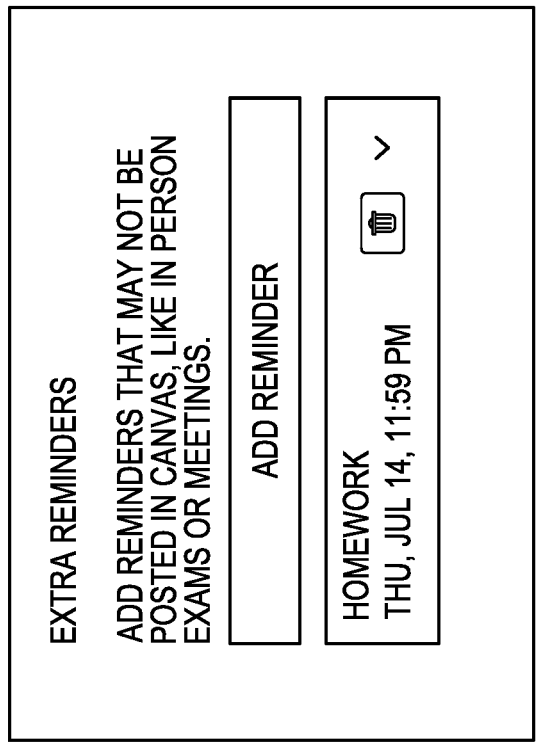
FIG. 12 is a diagram of extra reminders, according to the present invention.

Turning to FIG. 12 is an example in which a user can add extra reminders. These extra reminders can be included in the merging and sorting process of their various due dates. The users add these. These extra reminders are stored in the same database where customizations are stored in FIG. 7.

Visual Presentation of Upcoming Reminders

Figure 13:
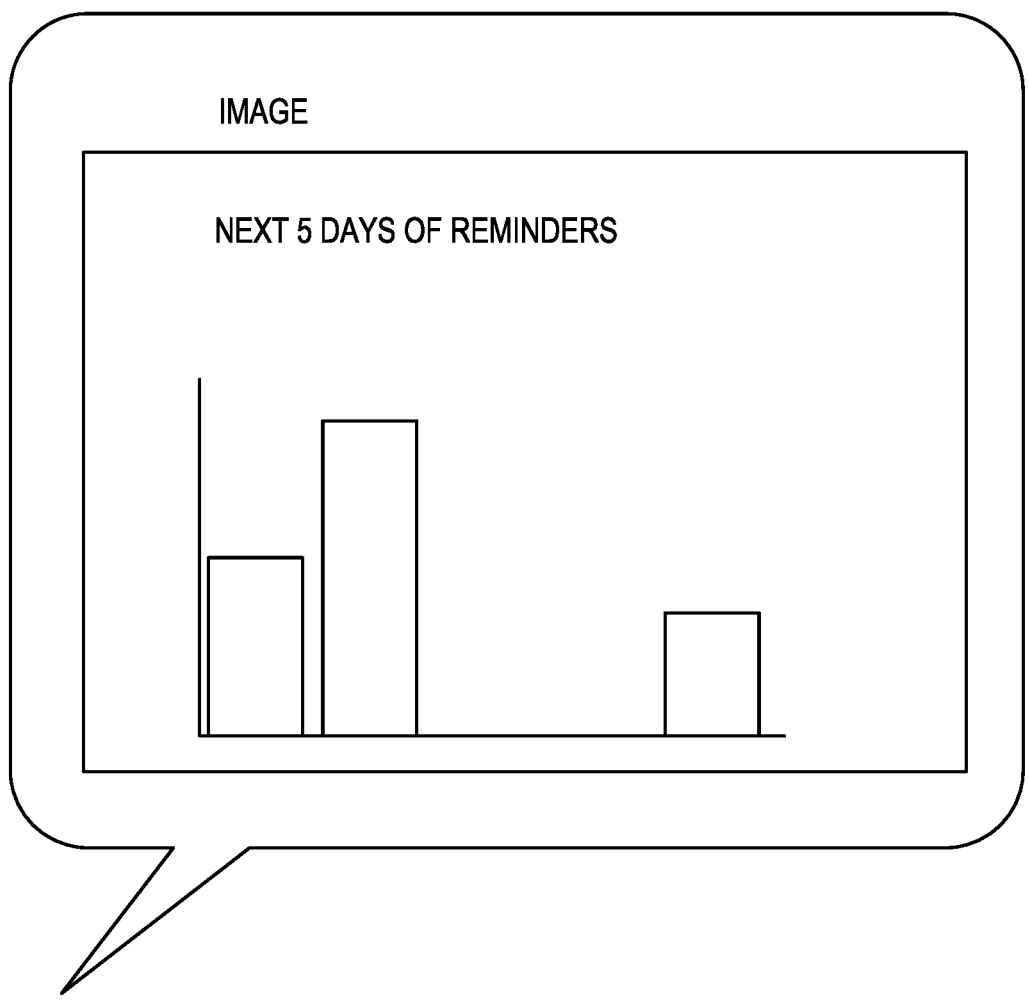
FIG. 13 is a picture of a message as an image, according to the present invention.

Referring to FIG. 13, is an example of upcoming reminders in the bar chart format. Here is an alternative visual depiction of the user's upcoming reminders. These visual formats can be specified by the user customizations in FIG. 7.

Global Reminders

In one example, the sponsor of the messages may be able to send non-course related messages, including notices of upcoming events and other advertising. For example, students at a school in their customizations in FIG. 7 can have global school events included in their texts. Unlike course related information, which is typically derived from language management systems (LMS), these reminder come from other sources. The sources may be a school's administration, a school's student government, a schools club, or a sponsor. The reminder would be included along with the user's assignments.

Further examples of customizations and global reminders include announcing updates to the Lazy Texts system. Holidays as part of the upcoming messages. Or even events curated by another user in which the user opts to connect in the user customizations in FIG. 7.

Information Processing System

Figure 14:
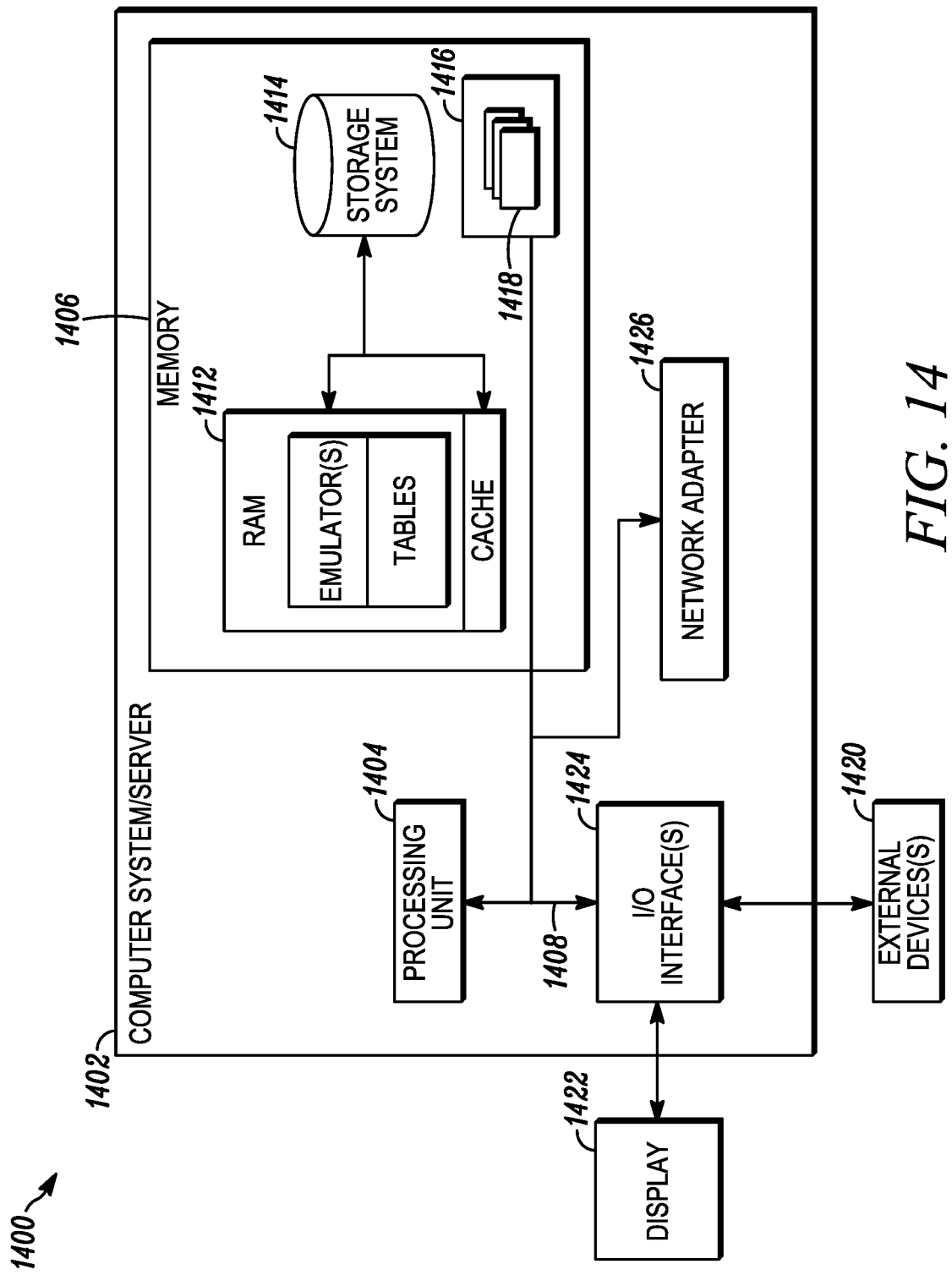
FIG. 14 is a block diagram illustrating one example of a client or server information processing system, according to the present invention.

Referring now to FIG. 14, this figure is a block diagram illustrating an information processing system that can be utilized in non-limiting examples or embodiments of the present invention. The information processing system 1402 is based upon a suitably configured processing system configured to implement one or more embodiments of the presently claimed invention. Any suitably configured processing system can be used as the information processing system 1402 in embodiments of the present invention. The components of the information processing system 1402 can include but are not limited to, one or more processors or processing units 1404, a system memory 1406, and a bus 1408 that couples various system components, including the system memory 1406 to the processor 1404.

The bus 1408 represents one or more of any of several types of bus structures, including a memory bus or memory controller, a peripheral bus, an accelerated graphics port, and a processor or local bus using any of a variety of bus architectures. By way of example, and not limitation, bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1406 can also include computer system readable media in the form of volatile memory, such as random access memory (RAM) 1410 and/or cache memory 1412. RAM 1410 may include emulator(s) 1410.

The information processing system 1402 can further include other removable/non-removable, volatile/non-volatile computer system storage media. By way of example only, a storage system 1414 can be provided for reading from and writing to a non-removable or removable, non-volatile media such as one or more solid-state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1408 by one or more data media interfaces. The memory 1406 can include at least one program product having a set of program modules that are configured to carry out the functions of an embodiment of the present invention.

Program/utility 1416, having a set of program modules 1418, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. Program modules 1418 generally carry out the functions and/or methodologies of embodiments of the present invention.

The information processing system 1402 can also communicate with one or more external devices 1420 such as a keyboard, a pointing device, a display 1422, etc.; one or more devices that enable a user to interact with the information processing system 1402; and/or any devices (e.g., network card, modem, etc.) that enable computer system/server 1402 to communicate with one or more other computing devices. Such communication can occur via I/O interfaces 1424. Still yet, the information processing system 1402 can communicate with one or more networks such as a local area network (LAN), a general wide area network (WAN), and/or a public network (e.g., the Internet) via network adapter 1426. As depicted, the network adapter 1426 communicates with the other components of the information processing system 1402 via the bus 1408. Other hardware and/or software components can also be used in conjunction with the information processing system 1402. Examples include but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the "user's computer, partly on the "user's computer, as a standalone software package, partly on the "user's computer and partly on a remote computer or entirely on the remote computer or server. In the latter scenario, the remote computer may be connected to the "user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Non-Limiting Examples

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

What is claimed is:

1. A method for providing user-control message service comprising:
    converting by a server, one or more user preferences into each third-party specific filter for one of a plurality of third-party servers;
    accessing, by the server, using at least one of API calls, web scraping, file transfer protocol (FTP), http methods, or a combination thereof, data using the third-party specific filter in a plurality of third-party formats from the plurality of third-party servers, wherein the data in the plurality of third-party formats from the plurality of third-party servers;
    filtering the data in the plurality of third-party formats from the plurality of third-party servers which has been accessed according to user preferences, the user preferences including a mobile device identifier;
    converting the data which has been accessed and filtered using the third-party specific filter in the plurality of third-party formats from the plurality of third-party servers into a single structure format;
    converting the single structure format into at least one message service format compatible with one of a plurality of message services specified by the one or more user preferences, wherein the converting the data from each data source in a plurality of data sources, in the plurality of third-party formats from the plurality of third-party servers into a homogeneous format compatible with the message service format includes converting into the homogeneous format with a number of total reminders merged into a single message as specified by the user preferences; and
    sending the data which has been converted into the message service format to a mobile device as specified by the mobile device identifier.

2. The method of claim 1, wherein the server and at least one of the third-party servers are each controlled by different business entities.

3. The method of claim 1, wherein the converting the single structure format into at least one message service format compatible with the one or a plurality of message services is one of an SMS protocol or an instant message for receipt by a messaging app, wherein the sending the data which has been converted into the SMS protocol or instant message to the mobile device as specified by the mobile device identifier, and further comprising:
    sending the data which has been converted into the SMS protocol to an SMS gateway or using a CPaaS API to send to the mobile device as specified by the mobile device identifier.

4. The method of claim 1, where the sending the data which has been converted into the message service format to a mobile device as specified by the mobile device identifier is sent on a time schedule based on the one more user preferences, the method further comprising:
    periodically performing the steps of the accessing, the filtering and the converting the data which has been accessed;
    identifying urgent data which includes a due date prior to a next time in the time schedule; and
    based on identifying urgent data, which is prior to the next time in the time schedule, sending the urgent data which has been converted into the message service format to the mobile device as specified by the mobile device identifier.

5. The method of claim 1, wherein the one or more user preferences include identifying at least one parent or guardian authorized to also receive the data which has been converted into a message service format; and
    wherein the sending the data which has been converted into the message service format to the mobile device as specified by the mobile device identifier also includes sending the data which has been converted into the message service format to another mobile device as specified by another mobile device identifier.

6. The method of claim 1, wherein the one or more user preferences include identifying at least one parent or guardian authorized to also receive the data which has been converted into a first message service format for a first mobile device identifier and to also receive the data which has been converted into a second message service format for a second mobile device identifier; and
    wherein the sending the data which has been converted into the first message service format to the first mobile device as specified by the first mobile device identifier and the data which has been converted into the second message service format to the second mobile device as specified by the second mobile device identifier also includes sending the data which has been converted into the message service format to another mobile device as specified by another mobile device identifier.

7. The method of claim 1, wherein the user preferences for filtering includes one or more of show courses, skip courses, set days, maximum assignments, maximum days, skipped classes, skip completed and skip completed to-dos.

8. The method of claim 1, wherein the user preferences for filtering includes one or more of planner is empty, time and time zone, active status, texts paused, and skipped days of week.

9. The method of claim 1, wherein the user preferences for formatting includes one or more of class, customized course names, birthday, time format, time-zone, name, and limit reminder amount.

10. The method of claim 1, wherein the data in the plurality of third-party formats from the plurality of third-party servers includes a learning management system, email system and other data sources.

11. The method of claim 1, further comprising:
providing a user-interface to receive the one or more user preferences; and
displaying a preview of the data which has been converted into the message service according to the one or more user preferences.

12. The method of claim 11, wherein the displaying the preview of the data is on a website or on an app associated with the mobile device which has been converted into the message service according to the one or more user preferences.

13. The method of claim 11, wherein the displaying the preview of the data further includes displaying at least one of previous data which has been converted into the message service, future data which has been converted into the message service, or a combination thereof.

14. The method of claim 1, wherein the sending the data which has been converted into the message service format includes sending a multimedia message with to the mobile device as specified by the mobile device identifier, the multimedia message including at least one of a still image, a sound, a video, or a combination thereof.

15. The method of claim 1, further comprising:
accessing, by the server, data in an additional third-party format from an additional third-party server, wherein the server and the additional third-party server are controlled by different business entities;
filtering the data in the additional third-party format which has been accessed according to user preferences, the user preferences including a mobile device identifier;
converting the data in the additional third-party format into the message service format compatible with the one or a plurality of message services, wherein the message service format is specified by the user preferences; and
sending the data which has been converted into the message service format.

16. A method for providing user-control message service for a plurality of data sources comprising:
for each data source in a plurality of data sources, performing
converting by a server, one or more user preferences into each third-party specific filter for one of a plurality of third-party servers;
accessing, by the server, using at least one of API calls, web scraping, file transfer protocol (FTP), http methods, or a combination thereof, data using the third-party specific filter in a plurality of third-party formats from the plurality of third-party servers, wherein the data in the plurality of third-party formats from the plurality of third-party servers;
filtering the data in the plurality of third-party formats from the plurality of third-party servers which has been accessed according to user preferences, the user preferences including a mobile device identifier;
converting the data which has been accessed and filtered using the third-party specific filter in the plurality of third-party formats from the plurality of third-party servers into a single structure format;
converting the single structure format into at least one message service format compatible with one of a plurality of message services specified by the one or more user preferences, wherein the converting the data from each data source in the plurality of data sources, in the plurality of third-party formats from the plurality of third-party servers into a homogeneous format compatible with the message service format includes converting into the homogeneous format with a number of total reminders merged into a single message as specified by the user preferences; and
sending the data which has been converted into the message service format to a mobile device as specified by the mobile device identifier.

17. A device for providing user-control message service, comprising:
a processor device; and
a memory operably coupled to the processor device and storing computer-executable instructions causing:
converting by a server, one or more user preferences into each third-party specific filter for one of a plurality of third-party servers;
accessing, by the server, using at least one of API calls, web scraping, file transfer protocol (FTP), http methods, or a combination thereof, data using the third-party specific filter in a plurality of third-party formats from the plurality of third-party servers, wherein the data in the plurality of third-party formats from the plurality of third-party servers;
filtering the data in the plurality of third-party formats from the plurality of third-party servers which has been accessed according to user preferences, the user preferences including a mobile device identifier;
converting the data which has been accessed and filtered using the third-party specific filter in the plurality of third-party formats from the plurality of third-party servers into a single structure format, wherein the converting the data from each data source in a plurality of data sources, in the plurality of third-party formats from the plurality of third-party servers into a homogeneous format compatible with the message service format includes converting into the homogeneous format with a number of total reminders merged into a single message as specified by the user preferences;
converting the single structure format into at least one message service format compatible with one of a plurality of message services specified by the one or more user preferences; and
sending the data which has been converted into the message service format to a mobile device as specified by the mobile device identifier.

18. The device of claim 17, wherein the data in the plurality of third-party formats from the plurality of third-party servers includes a learning management system, email system and other data sources.

19. The device of claim 17, wherein the sending the data which has been converted into the message service format includes sending a multimedia message with to the mobile device as specified by the mobile device identifier, the multimedia message including at least one of a still image, a sound, a video, or a combination thereof.

20. The device of claim 17, further comprising:
providing a user-interface to receive the one or more user preferences; and
displaying a preview of the data which has been converted into the message service according to the one or more user preferences.

\* \* \* \* \*